United States Patent [19]
Fang et al.

[11] Patent Number: 5,835,618
[45] Date of Patent: Nov. 10, 1998

[54] UNIFORM AND NON-UNIFORM DYNAMIC RANGE REMAPPING FOR OPTIMUM IMAGE DISPLAY

[75] Inventors: Ming Fang, Cranbury; Jianzhong Qian, Princeton Jct., both of N.J.; Helmuth Schramm, Neunkirchen, Germany

[73] Assignee: Siemens Corporate Research, Inc., Princeton, N.J.

[21] Appl. No.: 722,756

[22] Filed: Sep. 27, 1996

[51] Int. Cl.[6] .............................. G06K 9/36; G06T 5/00; G06T 9/00
[52] U.S. Cl. ..................... 382/132; 382/239; 382/261; 382/266; 382/274
[58] Field of Search ................................ 382/132, 274, 382/275, 264, 263, 262, 261, 260, 266

[56] References Cited

U.S. PATENT DOCUMENTS

| | | | |
|---|---|---|---|
| 5,051,902 | 9/1991 | Hishinuma | 382/132 |
| 5,357,549 | 10/1994 | Maack et al. | 378/62 |
| 5,454,044 | 9/1995 | Nakajima | 382/132 |
| 5,454,053 | 9/1995 | Okubo et al. | 382/132 |
| 5,493,622 | 2/1996 | Tsuchino et al. | 382/132 |

*Primary Examiner*—Scott Rogers
*Attorney, Agent, or Firm*—Donald B. Paschburg

[57] ABSTRACT

A contexture dependent dynamic range remapping system utilizes background estimation, mask generation, parameter estimation and dynamic range remapping of an original image to provide an optimum output image. The dynamic range remapping includes an additive algorithm or a multiplicative algorithm or a combination of both algorithms. The output from the algorithms could be filtered by an edge-preserving filter to provide a filtered output image. The system adaptively compresses the dynamic range of the DC and slow-varying signals in the original image significantly while preserving and enhancing fine structures.

33 Claims, 2 Drawing Sheets

UNIFORM AND NON-UNIFORM DYNAMIC RANGE REMAPPING FOR OPTIMUM IMAGE DISPLAY

BACKGROUND OF THE INVENTION

1. Field of the Invention

The present invention relates to context dependent dynamic range remapping for optimal image display and enhancement and more specifically to adaptively compressing the dynamic range in an image while preserving and enhancing fine structures.

2. Description of the Prior Art

Radiology is a major application domain of medical imaging technology. About 30% of radiology examinations in the United States, such as CT, MRI, PET, SPECT, DSA, Untrasonography, and digital fluorography are taken directly in digital form. The other 70% of examinations on the skull, chest, breast, abdomen, and bone are performed with conventional X-rays films. Different kinds of film digitizers can be used to convert X-ray films into digital format for processing.

The trend in medical imaging is to increase the use of digital formatting for the following reasons. First, the medical images, in digital form, can be achieved and transferred very easily. Second, the digital images can be processed by image enhancement algorithms, volume rendering, and image evaluation techniques to provide useful diagnostic information. Another push for digital formatting is from the picture archiving and communication systems (PACS) community who envision an all digital radiology environment in hospitals and medical facilities.

Many medical modalities, such as CT, MRI, digital X-ray or digitized X-ray films, provide digital images with 10 to 12 bits of grey levels. A conventional monitor normally displays only 8 bits of data. To view these 10 to 12 bits of data, physicians often have to adjust the display window-level to get an acceptable view of the part of interest of the image. Often, to make a diagnostic decision, several different parts of the image must be viewed. To do so presently requires that the physician adjust the display window-level several times. Physicians often have problems getting the optimum display settings for both the display window and the level, since both parameters are not independent. The optimum setting of the combination of the display window-level can be time-consuming and frustrating. Besides the inconvenience, this prior art approach does not display all of the interesting parts of the image at the same time. Also, each of these image parts, by itself, does not even necessarily provide adequate diagnostic useful information.

Therefore, it is an object of the present invention to pack this 10 to 12 bits of information into the typical 8-bit monitor display in a meaningful way. There are some existing prior art systems that aim at solving this problem. These prior art systems can generally be classified into two categories: global techniques and local techniques.

For global methods, one prior art transformation scheme is applied to all of the pixels of an input image. In general, this technique is unable to adapt to the original input signal, since the technique does not distinguish between relevant and non-relevant signals. Therefore, this approach may work well for some images, but will work poorly in more complex situations where details in both high and low intensity regions need to be displayed. The widely used manual adjustment of display window-level falls also into this category. However, this simple method usually can not display all of the interesting parts of the image simultaneously. In addition, the optimum setting of both window and level display parameters is difficult. Another representative technique in this category is the histogram equalization scheme, which tends to overenhance the image contrast and often leads to a noisy appearance of the output image.

In contrast, the local methods provide, in general, a better image display, since the local signal properties are taken into consideration. U.S. Pat. No. 5,357,549 entitled Method Of Dynamic Range Compression Of An X-ray Image And Apparatus Effectuating The Method, issued to Maack et. al., discloses a dynamic range compression scheme in which a nonlinear mapping function, dependent on the lowpass filtered signal obtained from the original input image, is used to determine the equalization value for each pixel in the image. This scheme is a local scheme since the final output is dependent on the lowpass filtered signal from the local neighbor around each pixel. The nonlinear mapping function preserves the range of primary interest with original grey level resolution, while allowing the display of structures in the further ranges with coarse grey level resolution. The main disadvantage of this prior art scheme is the limitation of displaying only one range of image data with primary interest. This is not suitable if more than one range needs to be displayed simultaneously.

SUMMARY OF THE INVENTION

The present invention is contexture dependent dynamic range remapping for optimum image display and enhancement. The system of the present invention can adaptively compress the dynamic range of the DC and slow-varying signals in an image significantly while preserving and enhancing fine structure. For images with larger dynamic range, this technique enables the user to view both dark and bright areas without adjusting the display window and level control. For images with normal dynamic range, this technique can be used to compress the DC and slow-varying signal and then to enhance the detail structures.

Background estimation, mask generation and parameter estimation is performed on an input image. An additive and a multiplicative, as well as a mixture algorithm for the dynamic range remapping is utilized. The output from the algorithms is filtered by an edge-preserving filter which provides the output image.

DETAILED DESCRIPTION OF THE INVENTION

Figure 1A:
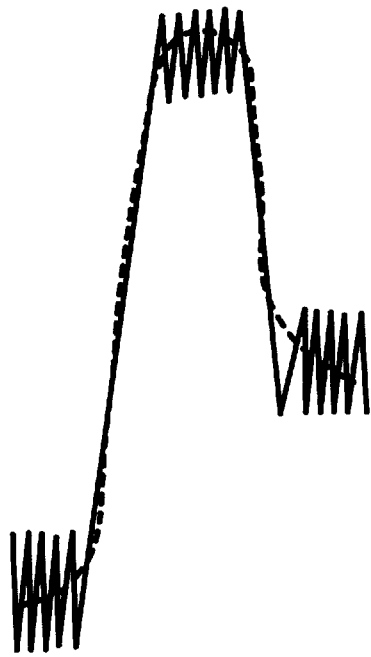
FIGS. 1a–1d illustrates the effects of the present invention on an original signal.
Figure 1B:
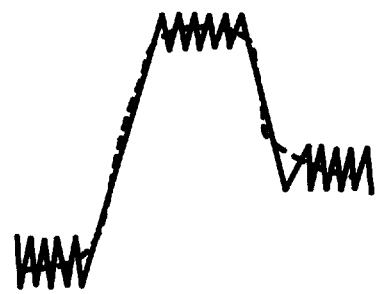
Figure 1C:
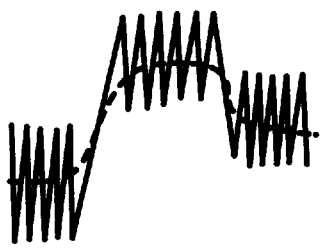
Figure 1D:
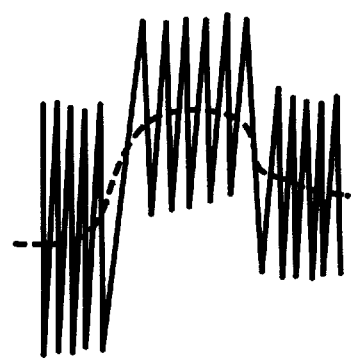

The basic idea behind the present invention is to compress the dynamic range of the DC and slow-varying signals in an image, while preserving and enhancing the fine structures represented by medium and high frequency components. FIG. 1 illustrates the basic idea of the dynamic range remapping system of the present invention. FIG. 1a illustrates the original signal. FIG. 1b illustrates the final display of conventional remapping without the dynamic range remapping of the present invention. FIG. 1c illustrates the original signal after compression of DC and slow-varying signals. FIG. 1d illustrates the final display after dynamic range remapping of the present invention. The dashed curves represent the DC and slow-varying signals in an image. The fine structures containing medium and high frequency signals are represented by the solid curves. In comparison with the final results of the conventional whole signal range remapping (FIG. 1b), the final signal after the adaptive dynamic range remapping (FIG. 1d) compresses only the dashed curve while preserving or even enhancing the fine structures represented by the solid curves.

As shown in FIG. 1, the conventional remapping reduced the dynamic range equally for both low and high frequency components. This could lead to a low contrast of the fine structures. These fine structures are of the primary interest for a diagnosis. In contrast, the adaptive dynamic range remapping technique of the present invention compresses only the DC and low frequency components represented by the dashed curves. The fine structures in the final display can be retained and even enhanced, as shown in FIG. 1(d).

Figure 2:
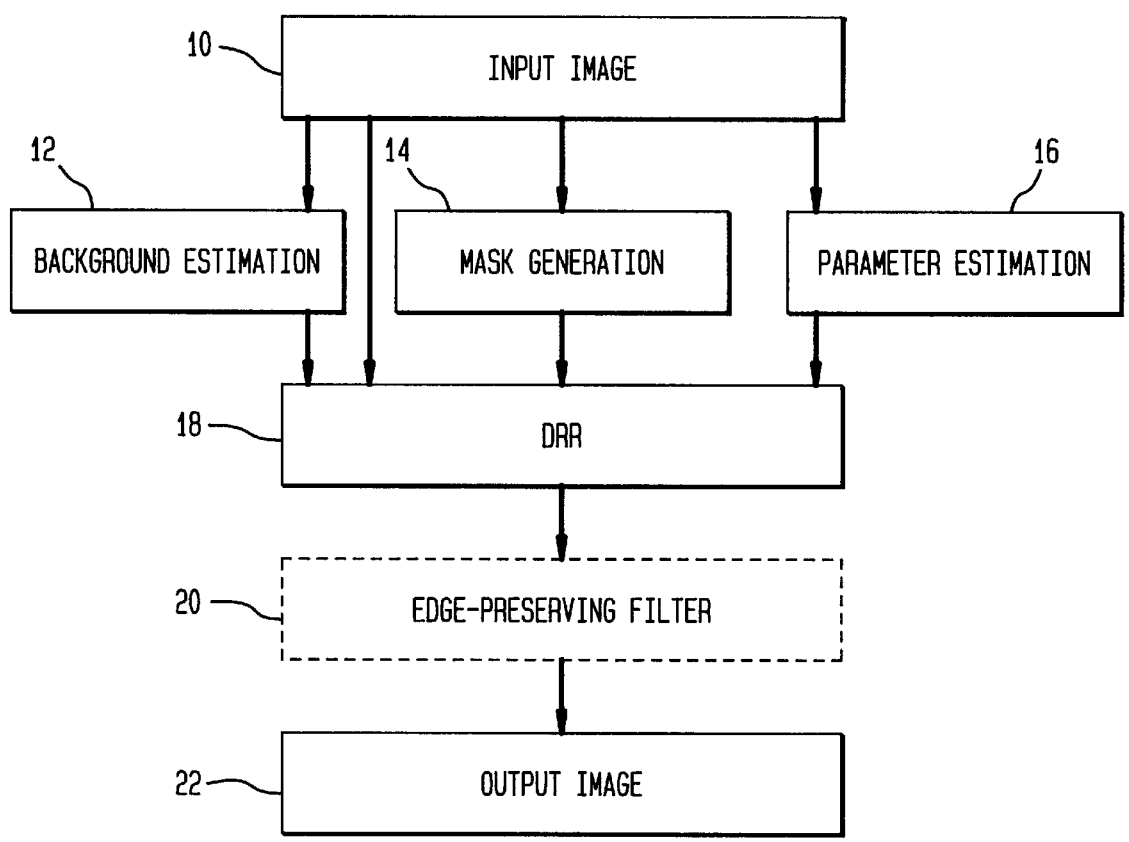
FIG. 2 illustrates a signal flow diagram of the dynamic range remapping system of the present invention.

FIG. 2 illustrates the signal flow diagram of the dynamic range remapping system of the present invention. To compress the DC and low frequency components of the input image 10, background estimation techniques 12, such as lowpass, median, and morphological filters are used to estimate the DC and slow-varying signal components from the original image 10. After the background is estimated, to compress the DC and slow-varying signals, the original image 10 is subtracted or divided by a portion of the estimated background image. A binary mask image containing the actual imaging area is generated by mask generation 14. The binary mask image is used to eliminate the overshutting ring artifact around the image after the processing. Some image parameters, such as the mean, maximum and minimum values, are also computed from the input image 10 by parameter estimation 16 for dynamic range remapping and normalization.

Both additive and multiplicative algorithms have been developed for the dynamic range remapping (DRR) 18. At a first glance, the additive algorithm may look similar to the well-known Unsharp Masking (UM) method. This is described by A. K. Jain in "Fundamentals of Digital Image Processing", Prentice Hall, Englewood Cliffs, N.J., 1989, p249. However, there are two major differences between the additive DRR algorithm of the present invention and the UM method. First, the purposes of each of the methods are totally different. While the UM method is mainly used to enhance edge structures in an image, the additive DRR algorithm is aiming at the remapping of the dynamic range of an image. Second, the additive DRR algorithm of the present invention has two positive thresholds which decide if the estimated background image or the original image should be used in the remapping process. By adjusting these two thresholds, the Over- or Under-shutting artifacts which are typically associated with the use of the UM method can be limited or virtually eliminated. The additive and the multiplicative algorithm can be described by the following four equations:

Additive algorithm:

$$\beta(x,y) = \theta(x,y) + (\rho - v(x,y))\alpha \quad \text{for} \quad \theta(x,y) > v(x,y) - \Delta 1$$
$$\theta(x,y) < v(x,y) + \Delta 2$$
$$\beta(x,y) = \theta(x,y) + (\rho - \theta(x,y))\alpha \text{ otherwise}$$

Multiplicative algorithm:

$$\beta(x,y) = \theta(x,y)/(v(x,y)\alpha + \rho(1-\alpha)) \quad \text{for} \quad \theta(x,y) > v(x,y) - \Delta 1$$
$$\theta(x,y) < v(x,y) + \Delta 2$$
$$\beta(x,y) = \theta(x,y)/(\theta(x,y)\alpha + \rho(1-\alpha)) \text{ otherwise}$$

where
$\theta(x,y)$ represents the input image
$v(x,y)$ represents the lowpass filtered image
$\beta(x,y)$ represents the output image
$\rho$ represents the mean intensity value of the image $0<\alpha<1$ represents the user defined control parameter
$\Delta 1$ and $\Delta 2$ are two small positive thresholds After the additive or multiplicative processing described above, the minimum and the maximum value of the original image are used to remap the dynamic range of the processed image to the one of the original image. In this remapping process, the high and medium frequency components in the image will be stretched and enhanced. By adjusting the control parameter, $\alpha$, the user can change the degree of the dynamic compression.

It is important to notice that the additive DRR system compresses the dynamic range of an image uniformly. In other words, it "takes out" the DC and slow-varying signal components from the original image, independent of the estimated background intensity. This property is useful, if a uniform remapping of the dynamic range of fine structures in both dark and bright regions is desirable. However, it is well known that the human perception is a non-linear process. In fact, researchers have been studying the human observer's ability to make contrast distinction for well over 100 years. This is described by B. M. Hemminger, et. al in "Perceptual Linearization Of Video Display Monitors For Medical Image Presentation", SPIE, *Medical Imaging*, 1994, Vol. 2164, p222. The minimum luminance difference required to see a contrast threshold is referred to as a Just Noticeable Difference (JND) and it is used for many experiments on human perception behavior. Experiments showed that the JND is a non-linear function of luminance. Moreover the JND value is much greater under low luminance than under high luminance conditions as described by C. Murchson (Editor) in "A Handbook of General Experimental Psychology", Clark University Press, Worcester Mass., 1934, p769. This suggests that human vision can make better distinction between small intensity changes in a medium and bright intensity region than in a dark region. Hence, it is desirable if some non-uniform remapping techniques can be used to compensate this nonlinearity. One of the possible solutions for the non-uniform dynamic range remapping is the multiplicative dynamic range remapping algorithm. The multiplicative algorithm not only compresses the DC and slow-varying signal components. It also makes the signal contrast in the bright regions smaller than the one in the dark regions. After the remapping, the signal contrast in the dark region is more enhanced than in the bright region.

Certainly, it is application dependent to decide if the additive or the multiplicative algorithm is more suitable to a particular application. The user should have the freedom to choose either the additive or the multiplicative algorithm. Another possibility is to use both algorithms simultaneously and then fuse the remapped images together to get the final image. The fusion of both images can be done by using either a simple or weighted averaging or any other fusion scheme. The final fused image will have a better contrast in the dark region while still preserving a reasonable contrast level in the bright region.

Since the dynamic range remapping algorithm enhances fine image structures and, therefore, also increases the noise level in the output image, 22 of FIG. 2, it is desirable to incorporate a smoothing filter in the system for reducing the noise level. Since the uniform smoothing filter smoothes not only the noise but also the fine structures, it is recommended to use an adaptive edge-preserving filter, 20 of FIG. 2, to reduce noise while preserving fine structures. Such a filter is described in U.S. patent application Ser. No. 08/672,194, now U.S. Pat. No. 5,771,318 entitled A Novel Adaptive Edge-Preserving Smoothing Filter by M. Fang and J. Qian filed Jun. 27, 1996 and assigned to the same assignee as the present invention.

It should also be pointed out that the above system can also be used in an iterative way. The output image 22 can be fed back as a new input image 10 and back into the system. Since the control parameter, α, can be set to a relatively small value in the iterative case, the final output image after some iterations could look more natural than the output image after only one step compression.

It is not intended that this invention be limited to the hardware or software arrangement, or operational procedures shown disclosed. This invention includes all of the alterations and variations thereto as encompassed within the scope of the claims as follows.

We claim:

1. A uniform and non-uniform dynamic range remapping system for optimum image display comprising:
   background estimation means for receiving an original image and for providing an estimated background image;
   mask generation means for receiving an original image;
   parameter estimation means for receiving an original image; and,
   dynamic range remapping means connected to said background estimation means, said mask generation means and said parameter estimation means for transmitting an output image;
   wherein said dynamic range remapping means comprises:
     additive algorithm means; and
     means for using a minimum and maximum value of said original image to remap dynamic range of processed image to said original image.

2. A uniform and non-uniform dynamic range remapping system for optimum image display as claimed in claim 1 further comprising:
   edge preserving filter means connected to said dynamic range remapping means.

3. A uniform and non-uniform dynamic range remapping system for optimum image display as claimed in claim 1 wherein:
   output of said dynamic range remapping means is fed back into said background estimation means, said mask generation means and said parameter estimation means.

4. A uniform and non-uniform dynamic range remapping system for optimum image display as claimed in claim 1 wherein said background estimation means comprises:
   filter means for estimating DC and slow-varying signal components from said original image therefore providing said estimated background image.

5. A uniform and non-uniform dynamic range remapping system for optimum image display as claimed in claim 1 wherein said mask generation means comprises:
   means for compressing DC and slow-varying signals for providing a binary mask image.

6. A uniform and non-uniform dynamic range remapping system for optimum image display as claimed in claim 1 wherein said mask generation means comprises:
   means for subtracting said original image by a portion of said estimated background image for providing a binary mask image.

7. A uniform and non-uniform dynamic range remapping system for optimum image display as claimed in claim 1 wherein said mask generation means comprises:
   means for dividing said original image by a portion of said estimated background image for providing a binary mask image.

8. A uniform and non-uniform dynamic range remapping system for optimum image display as claimed in claim 1 wherein said parameter estimation means comprises:
   means for computing image parameters such as mean, maximum and minimum values from said original image.

9. A uniform and non-uniform dynamic range remapping system for optimum image display as claimed in claim 1 wherein said dynamic range remapping means further comprises:
   fusion means for fusing said remapped images together to form said output image.

10. A uniform and non-uniform dynamic range remapping system for optimum image display as claimed in claim 1 wherein:
    said dynamic range remapping means takes out DC and slow-varying signal components from said original image independent of estimated background intensity.

11. A uniform and non-uniform dynamic range remapping system for optimum image display as claimed in claim 1 wherein said additive algorithm means comprises:
    positive threshold means for deciding if said estimated background image or said original image should be used for remapping process.

12. A uniform and non-uniform dynamic range remapping system for optimum image display as claimed in claim 1 wherein:
    said additive algorithm means is defined by $$\beta(x,y) = \theta(x,y) + (\rho - \nu(x,y))\alpha \quad \text{for} \quad \theta(x,y) > \nu(x,y) - \Delta 1$$
$$\theta(x,y) < \nu(x,y) + \Delta 2$$
$$\beta(x,y) = \theta(x,y) + (\rho - \theta(x,y))\alpha \text{ otherwise}$$

where:
   $\theta(x,y)$ represents said original image;
   $\nu(x,y)$ represents a lowpass filtered image;
   $\beta(x,y)$ represents said output image;
   $\rho$ represents mean intensity value of image;
   $0<\alpha<1$ represents a user defined control parameter; and,
   $\Delta 1$ and $\Delta 2$ are two small positive thresholds.

13. A uniform and non-uniform dynamic range remapping system for optimum image display as claimed in claim 1 wherein said dynamic range remapping means further comprises:
    multiplicative algorithm means.

14. A uniform and non-uniform dynamic range remapping system for optimum image display as claimed in claim 13 further comprising:
    edge preserving filter means connected to said dynamic range remapping means.

15. A uniform and non-uniform dynamic range remapping system for optimum image display as claimed in claim 13 wherein:
    output of said dynamic range remapping means is fed back into said background estimation means, said mask generation means and said parameter estimation means.

16. A uniform and non-uniform dynamic range remapping system for optimum image display as claimed in claim 13 wherein said background estimation means comprises:
    filter means for estimating DC and slow-varying signal components from said original image therefore providing said estimated background image.

17. A uniform and non-uniform dynamic range remapping system for optimum image display as claimed in claim 13 wherein said parameter estimation means comprises:
    means for computing image parameters such as mean, maximum and minimum values from said original image.

18. A uniform and non-uniform dynamic range remapping system for optimum image display as claimed in claim 13 wherein said dynamic range remapping means further comprises:
    fusion means for fusing said remapped images together to form said output image.

19. A uniform and non-uniform dynamic range remapping system for optimum image display as claimed in claim 13 wherein:
said dynamic range remapping means takes out DC and slow-varying signal components from said original image independent of estimated background intensity.

20. A uniform and non-uniform dynamic range remapping system for optimum image display as claimed in claim 13 wherein:
said multiplicative algorithm means compresses DC and slow-varying signal components and also makes signal contrast in bright regions smaller than signal contrast in dark regions.

21. A uniform and non-uniform dynamic range remapping system for optimum image display as claimed in claim 13 wherein:
said multiplicative algorithm means is defined by $$\beta(x,y) = \theta(x,y)/(v(x,y)\alpha + \rho(1-\alpha)) \quad \text{for} \quad \theta(x,y) > v(x,y) - \Delta 1$$
$$\theta(x,y) < v(x,y) + \Delta 2$$
$$\beta(x,y) = \theta(x,y)/(\theta(x,y)\alpha + \rho(1-\alpha)) \text{ otherwise}$$

where:
$\theta(x,y)$ represents said original image;
$v(x,y)$ represents a lowpass filtered image;
$\beta(x,y)$ represents said output image;
$\rho$ represents a mean intensity value of image;
$0<\alpha<1$ represents a user defined control parameter; and,
$\Delta 1$ and $\Delta 2$ are two small positive thresholds.

22. A uniform and non-uniform dynamic range remapping system for optimum image display comprising:
a background estimator for receiving an original image and for providing an estimated background image;
a mask generator connected to said background estimator for receiving said estimated background image and an original image;
a parameter estimator for receiving an original image; and,
a dynamic range remapper connected to said background estimator, said mask generator and said parameter estimator for transmitting an output image; wherein said dynamic range remapper comprises:
an additive algorithm; and
means for using a minimum and maximum value of said original image to remap dynamic range of processed image to said original image.

23. A uniform and non-uniform dynamic range remapping system for optimum image display as claimed in claim 22 further comprising:
an edge preserving filter connected to an output of said dynamic range remapper.

24. A method of performing uniform and non-uniform dynamic range remapping for optimum image display comprising the steps of:
estimating a background of an original image to provide an estimated background image;
generating a binary mask image from said original image and said estimated background image;
estimating parameters of said original image; and,
remapping dynamic range therefore providing an output image; wherein remapping dynamic range comprises the steps of:
utilizing a multiplicative algorithm; and
using a minimum and maximum value of said original image to remap dynamic range of processed image to said original image.

25. A method of performing uniform and non-uniform dynamic range remapping for optimum image display as claimed in claim 24 further comprising the step of:
edge preserving filtering after remapping dynamic range.

26. A uniform and non-uniform dynamic range remapping system for optimum image display comprising:
background estimation means for receiving an original image and for providing an estimated background image;
mask generation means for receiving an original image;
parameter estimation means for receiving an original image; and
dynamic range remapping means connected to said background estimation means, said mask generation means and said parameter estimation means for transmitting an output image;
wherein said dynamic range remapping means comprises:
multiplicative algorithm means; and
means for using a minimum and maximum value of said original image to remap dynamic range of processed image to said original image.

27. A uniform and non-uniform dynamic range remapping system for optimum image display as claimed in claim 26 further comprising:
edge preserving filter means connected to said dynamic range remapping means.

28. A uniform and non-uniform dynamic range remapping system for optimum image display as claimed in claim 26 wherein:
output of said dynamic range remapping means is fed back into said background estimation means, said mask generation means and said parameter estimation means.

29. A uniform and non-uniform dynamic range remapping system for optimum image display as claimed in claim 26 wherein said background estimation means comprises:
filter means for estimating DC and slow-varying signal components from said original image therefore providing said estimated background image.

30. A uniform and non-uniform dynamic range remapping system for optimum image display as claimed in claim 26 wherein said parameter estimation means comprises:
means for computing image parameters such as mean, maximum and minimum values from said original image.

31. A uniform and non-uniform dynamic range remapping system for optimum image display as claimed in claim 26 wherein said dynamic range remapping means further comprises:
fusion means for fusing said remapped images together to form said output image.

32. A uniform and non-uniform dynamic range remapping system for optimum image display as claimed in claim 26 wherein:
said dynamic range remapping means takes out DC and slow-varying signal components from said original image independent of estimated background intensity.

33. A uniform and non-uniform dynamic range remapping system for optimum image display as claimed in claim 26 wherein:
said multiplicative algorithm means compresses DC and slow-varying signal components and also makes signal contrast in bright regions smaller than signal contrast in dark regions.

* * * * *